Dec. 15, 1970     C. F. SCHAEFER     3,547,522
ON-AXIS COLLIMATED VIEWING SYSTEM
Filed Sept. 4, 1968     2 Sheets-Sheet 1
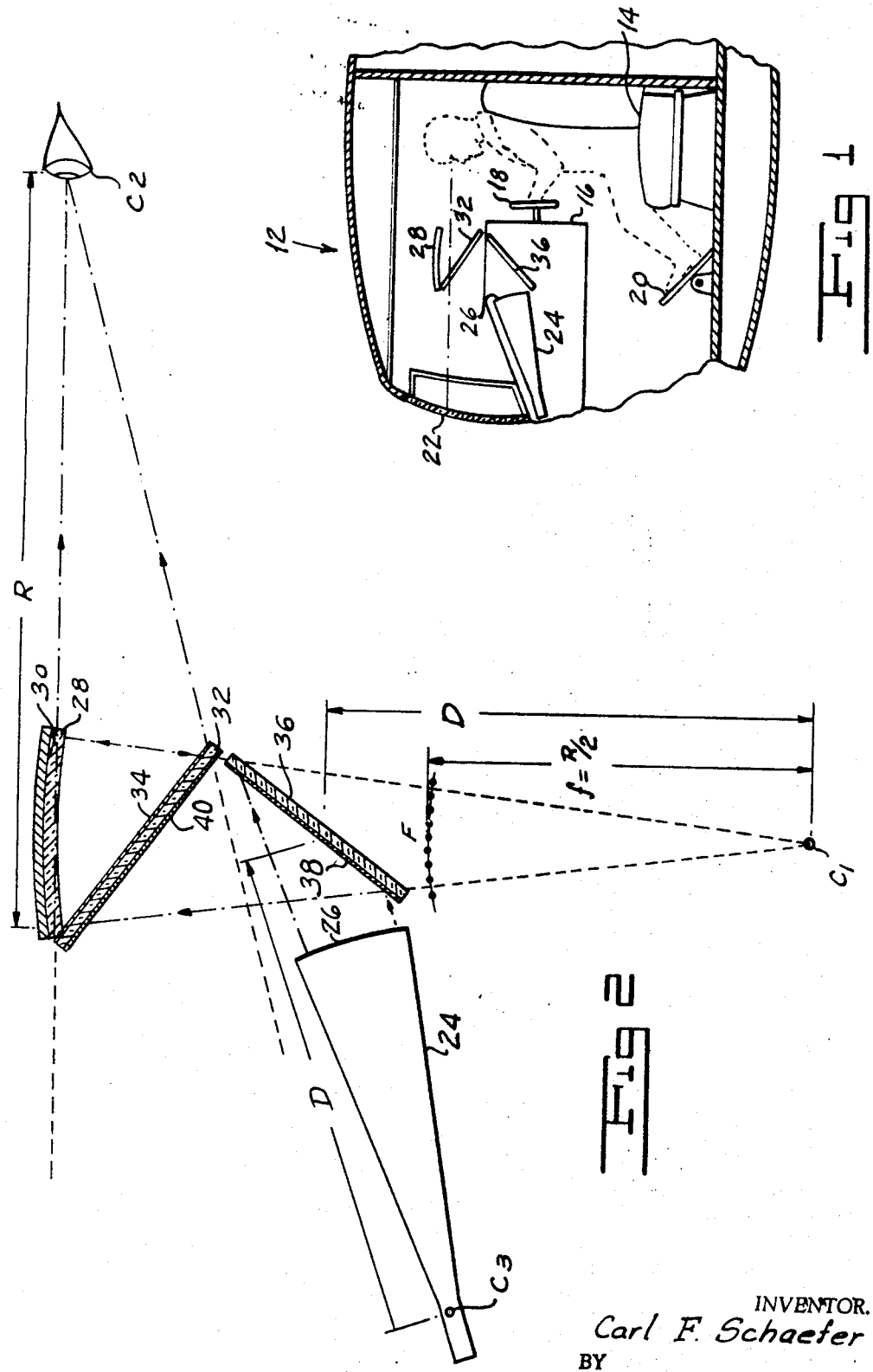
INVENTOR.
Carl F. Schaefer
BY
Shenier & O'Connor
ATTORNEYS

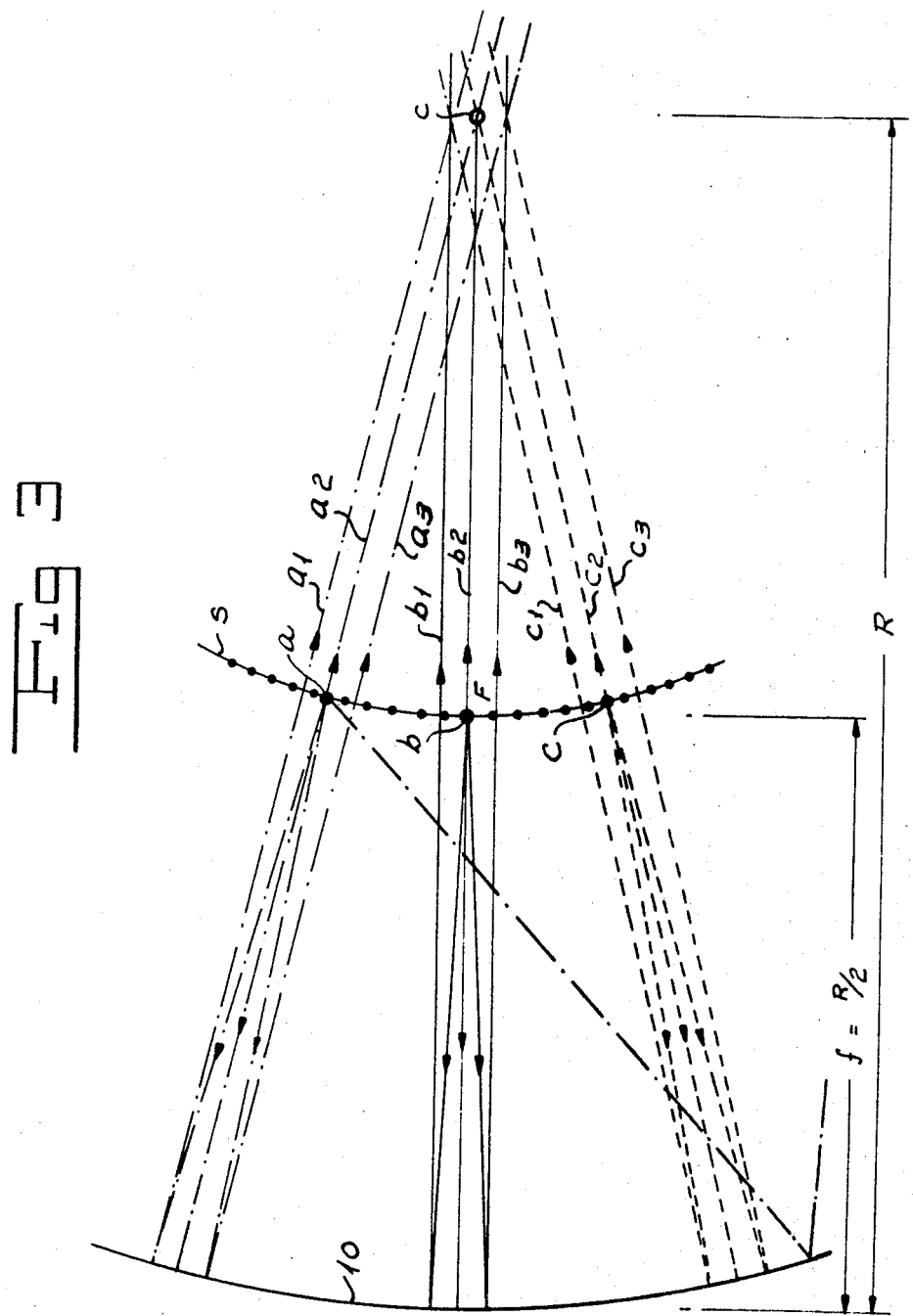

United States Patent Office 3,547,522
Patented Dec. 15, 1970

3,547,522
ON-AXIS COLLIMATED VIEWING SYSTEM
Carl F. Schaefer, Westport, Conn., assignor to United
  Aircraft Corporation, East Hartford, Conn., a corporation of Delaware
Filed Sept. 4, 1968, Ser. No. 757,396
Int. Cl. G02b 27/14
U.S. Cl. 350—174                                       4 Claims

ABSTRACT OF THE DISCLOSURE

A head up on-axis optical system for presenting an observer with a straight ahead view of the face of an instrument or the like from a head up normal viewing position in which a plane mirror mounted adjacent the instrument face and out of the observer's line of sight translates an image of the face to the reflecting surface of a spherical mirror located out of the observer's line of sight with its central axis generally perpendicular thereto so that the spherical mirror produces an image of the face at the focal distance. A partial reflector, the center of which is located adjacent the central axis of the spherical mirror, permits the observer to view the image produced by the spherical mirror as if he were positioned at the center of curvature of the spherical mirror without interfering with his view of the outside scene.

BACKGROUND OF THE INVENTION

There are known in the prior art a number of optical systems which provide the pilot of an aircraft, for example, with a view both of the outside scene and of an image of an instrument such, for example, as the face of a cathode ray tube in his normal, head-up viewing position. Systems of this type assist the pilot in operating the craft, particularly on landing, while not interfering with his natural tendency to direct his attention to the outside scene rather than to the instrument faces at breakthrough.

While most of the systems known in the prior art are in some degree successful in achieving their object of presenting the pilot with an image of an instrument or the like while not interfering with his view of the outside scene, they are not as effective as is desirable. These systems may generally be classified as either refractive systems or reflective systems. Refractive systems have the advantage of being accurate since they are on-axis systems. They do not generally provide large instantaneous fields of view, however, because the required large aperture would necessitate excessively large and heavy lens systems. Reflective systems, as contrasted with refractive systems, may be smaller and brighter, with larger fields of view. If they are not to interfere with the pilot's view of the outside scene, however, they must be off-axis systems and as a result they are less accurate than are refractive systems. Combined reflective and refractive systems in which an attempt is made to compensate for spherical aberration are complicated and expensive.

I have invented an on-axis collimated viewing system which overcomes the problems existing in both reflective and refractive viewing systems of the type known in the prior art. My system combines the accuracy of an on-axis system with the simplicity, light weight and large field of view which can be achieved with a reflective system. That is to say, my system is accurate, it is simple, it presents a large field of view and is light in weight, all without interfering with the pilot's view of the outside scene. It does not require compensation for spherical aberration.

SUMMARY OF THE INVENTION

One object of my invention is to provide an on-axis collimated viewing system which overcomes the defects of viewing systems of the prior art.

Another object of my invention is to provide an on-axis collimated viewing system which is a reflective on-axis system.

A further object of my invention is to provide an on-axis collimated viewing system which presents the pilot with an image of an instrument face or the like while not interfering with his view of the outside scene.

Still another object of my invention is to provide an on-axis collimated viewing system which is accurate, simple, light in weight and which presents a large field of view.

A still further object of my invention is to provide an on-axis collimated viewing system which does not require auxiliary compensation for spherical aberration.

Other and further objects of my invention will appear from the following description.

In general my invention contemplates the provision of a head up on-axis optical system for presenting an observer with a straight ahead view of an interior surface from a normal head up viewing position without interfering with his view of the outside scene, wherein a plane mirror mounted adjacent the instrument face and out of the observer's line of sight translates an image of the face to the reflecting surface of a spherical mirror positioned out of the observer's line of sight, with its central axis generally perpendicular to the line of sight, to cause the spherical mirror to produce an image of the face at its focal distance. A partial reflector positioned in the observer's line of sight, with its center adjacent the axis of the spherical mirror, permits the observer to view the image thus formed by the spherical mirror. In effect the system positions the observer at the center of curvature of a spherical mirror, which produces an image of the surface to be observed without interfering either with the observer's view of that image or of the image of the outside scene.

BRIEF DESCRIPTION OF THE DRAWINGS

In the accompanying drawings which form part of the instant specification and which are to be read in conjunction therewith and in which like reference numerals are used to indicate like parts in the various views:

FIG. 1 is a schematic view illustrating generally the relationship of the optical elements of my system to each other and to and to an observer in one application of the system.

FIG. 2 is a schematic view of an enlarged scale illustrating the relationship of the various parts of my on-axis collimated viewing system.

FIG. 3 is a diagrammatic view illustrating the principles underlying the operation of my on-axis collimated viewing system.

DESCRIPTION OF THE PREFERRED EMBODIMENT

Referring now to FIG. 3 which illustrates some of the principles incorporated in my on-axis collimated viewing system, I have shown a spherical reflecting surface 10 having a center of curvature at C. As is known in the art, a bundle of paraxial rays, or rays which are parallel to and very close to a diameter of a reflecting surface, such as spherical surface 10, are reflected by the surface to form a sharp point image on the diameter at a distance from the mirror which is equal to one half of the mirror radius R. This distance is known as the focal distance $f$. Considering a bundle of rays $b1$, $b2$ and $b3$ which are close to and parallel with the optical axis of the surface 10, they will be reflected by the surface to provide a sharp image at a point $b$, which also is the focal point F of the system. It will readily be appreciated that the same holds true for diameters other than the axis of the surface 10. For example, another group of rays $a1$, $a2$ and $a3$, all parallel to another diameter and close to it, converge to form a sharp image at a point $a$ at a distance $f$ from the surface. The same holds true for any other group of rays such, for example, as the rays $c1$, $c2$ and $c3$ which converge at a point $c$. Conversely, rays emanating from any point on a spherical surface at a distance $f$ from the surface 10 will be reflected by the surface 10 to provide a group of parallel rays adjacent the point $c$. Stated otherwise, light rays emanating from any point on a spherical surface concentric with the mirror and having a radius half that of the mirror are reflected by the mirror so as to be close to the center of curvature and will be parallel to each other. That is, the point producing these rays would appear to a viewer at the center of curvature to be at an infinite distance.

While the foregoing is true for paraxial rays, it is not true for rays at a distance from the center of curvature of the mirror. It will readily be appreciated that other rays emanating from a point will strike the reflecting surface at some distance from the point at which a radius through the point of emanation intersects the mirror. As that distance from the point of intersection increases, so does the deviation from parallelism of that ray with the paraxial rays at the center of curvature increases. It can be shown that the deviation from parallelism with the central ray is approximately proportional to the cube of the ratio of distance to the mirror radius. This deviation is known as spherical aberration. Owing to the fact that reflecting systems of the prior art are off-axis systems, this spherical aberration is present in the systems to an undesirable degree.

From the foregoing it will be apparent that an observer with his eye at the center of curvature C will view the reflected image of the spherical focal surface S with less spherical aberration than if the image is viewed from any other point. It will moreover be apparent that spherical aberration can be reduced by providing as large a radius of curvature as is possible, since this effect is inversely proportional to the cube of the mirror radius.

Referring now to FIGS. 1 and 2, I have shown an embodiment of my on-axis collimated viewing system which makes use of some of the facts, pointed out hereinabove, in providing an optical system in which spherical aberration is minimized without the necessity of providing any compensation therefor. In the particular embodiment of my system illustrated in the drawings, an aircraft cabin, indicated generally by the reference character 12, has a pilot's seat 14 located just behind the control support panel 16 on which the control wheel 18 is mounted. The rudder pedals 20 are located on the cabin floor at a position at which they are readily accessible to the pilot. As will readily be appreciated, space within the cabin 12 is limited and instruments which the pilot has to observe must be so located as not to interfere with his view through the cabin window 22.

One of the instruments which is provided to assist the pilot in operating the aircraft, especially on landing, may be a cathode ray tube 24 having a face 26 which presents the pilot with an image of terrain being approached. As has been pointed out hereinabove, it is highly desirable that the operator of the aircraft be able to view the picture on the face 26 from a normal head up position from which he can also observe the outside scene.

The form of my system illustrated in the drawings effectively permits the pilot to view an image of the face 26 emanating from a spherical reflecting surface to which the image is translated as if he were located at the center of curvature of the spherical mirror. Particularly, I mount a spherical mirror 28 within the cabin 12 at a location at which the line of sight of the pilot from a point C2 lies along a chord of the spherical reflecting surface 30 of the miror 28. In this position of the mirror, it presents a minimum obstruction to the pilot's view through the window 22. I place a partially reflecting plane mirror 32 having a partially reflecting coating 34 so that the reflection of the center of curvature C1 of the mirror 28 is at or very near the normal viewing position C2. Plane mirror 36 having a reflecting coating 38 is positioned in front of the face 26 of the tube 24 so that the reflected image of the spherical face 26 is on the focal surface $s$ of the spherical mirror 28. I make both the mirrors 32 and 36 first surface mirrors and I may also apply a non-reflective coating 40 to the surface of mirror 32 so as to eliminate undesirable secondary images.

As has been explained hereinabove, large amounts of eye motion cause undesirable changes in the apparent position of the reflected image owing to spherical aberration. That is, if the eye is displaced a distance from the center of curvature instead of the observed rays being perfectly parallel as they would be in a system which is free from spherical aberration, rays at a distance from the center of curvature converge toward the center in accordance with the relationship (1) $$\theta_1 = (X/R)^3$$

where $\theta_1$ is the convergence angle in radians, X is the distance of the reflected ray from the center of curvature of the spherical mirror 28 and R is the radius of curvature of the mirror. The permissible range of eye motion may be increased by making the radius of the cathode ray tube face 26 slightly larger than one half of the radius of the spherical mirror 28. Such an arrangement causes the reflected rays to diverge approximately in accordnace with the relationship (2) $$\theta_2 = X \cdot \frac{4\Delta F}{R^2}$$

where $\Delta F$ is the amount by which the radius of the cathode ray tube is increased. Under these conditions, the net convergence of the rays will be given approximately by the relationship.

(3) $$\Delta\theta = \frac{X^3}{R^3} - \frac{4\Delta F}{R^2} \cdot X$$

At any selected value of $X = X_0$ Equation 3 can be made equal to zero by making (4) $$\Delta F = \frac{X_0^2}{4R}$$

The absolute value of $\Delta\theta$ has a maximum at $X_m = X_0/3$ The value of $\Delta\theta$ at this point is (5) $$\theta_m = -2\left(\frac{X_m}{R}\right)^3$$

Although the magnitude of $\Delta\theta_m$ is twice that of the uncorrected $\Delta\theta$ at $X_m$, the uncorrected $\Delta\theta$ at $X_0$ would have been $3\sqrt{3}(X_m/R)^2$ which is $$\frac{3\sqrt{3}}{2} = 2.60$$

times the corrected $\Delta\theta_m$. Moreover, the value of X can be increased to $X_1 = 1.15 X_0$ before $\Delta\theta$ again has the same magnitude as $\Delta\theta_m$.

In operation of my on-axis collimated viewing system in connection with an aircraft, in installing the system the spherical mirror 28 is mounted in the cabin 12 with a chord thereof lying along the line of sight of an observer sitting in the pilot's seat 14. The plane mirror 36 is so positioned as to translate an image of the face 26 of the cathode ray tube 24 through the partial reflecting mirror 32 and onto the spherical surface of the mirror 28 to cause that mirror to form an image on the curved focal surface of the mirror. The partial reflecting mirror 32 is so positioned in the line of sight of the observer as to permit him to view the image of the fact 26 as if he were viewing it from the center of curvature C1 of the mirror. As has been explained hereinabove, from this point the observer will view the image with a minimum of spherical aberration.

It will be seen that I have accomplished the objects of my invention. I have provided an improved on-axis collimated viewing system which minimizes spherical aberration without the necessity of providing an auxiliary compensating means therefor. My system is simple and compact for the result achieved thereby. It is light in weight. It permits an observer to view the outside scene and an image of a surface within the craft from a normal head up position without interfering with his view of the outside scene.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. An on-axis optical system for an observer with a view of the outside scene and of an interior surface from a head up viewing position at which the observer has a nominal line of sight including in combination, a spherical reflector having an optical axis passing through the center of curvature of said reflector, means mounting said reflector out of said line of sight with its axis intersecting substantially at a right angle to said line of sight, means mounting said interior surface out of said line of sight in an off axis position optically substantially in the focal surface of said spherical reflector, plane reflector means for translating an image of said interior surface to said spherical reflector to cause the spherical reflector to produce an image of said surface, and a partial reflector on said axis in said line of sight for permitting the observer to view said image from said viewing position as if he were at said center of curvature.

2. A system as in claim 1 in which said interior surface is a spherical surface having a center of curvature, said mounting means positioning said interior surface with its center of curvature optically spaced from said spherical reflector by a distance equal to the radius of curvature of said spherical reflector.

3. A system as in claim 1 in which said interior surface is a generally spherical surface having a radius of curvature slightly greater than half that of said spherical reflector.

4. A system as in claim 1 in which said reflector mounting means positions said reflector with a chord thereof lying substantially along a line of sight.

References Cited

UNITED STATES PATENTS

| 3,423,155 | 1/1969 | Herrick et al. | 356—252 |
| 3,432,219 | 3/1969 | Shenker et al. | 350—55X |

FOREIGN PATENTS

| 731,759 | 6/1955 | Great Britain | 356—252 |

DAVID SCHONBERG, Primary Examiner

J. W. LEONARD, Assistant Examiner

U.S. Cl. X.R.

178—7.85